United States Patent
Lin

(10) Patent No.: US 8,235,850 B2
(45) Date of Patent: Aug. 7, 2012

(54) MULTIPLE SPROCKET ASSEMBLY

(75) Inventor: Diing-Jiun Lin, Taipei (TW)

(73) Assignee: Tien Hsin Industries Co., Ltd., Taichung Hsien (TW)

(*) Notice: Subject to any disclaimer, the term of this patent is extended or adjusted under 35 U.S.C. 154(b) by 756 days.

(21) Appl. No.: 12/325,312

(22) Filed: Dec. 1, 2008

(65) Prior Publication Data
US 2010/0137086 A1  Jun. 3, 2010

(51) Int. Cl.
*F16H 55/30* (2006.01)

(52) U.S. Cl. .......................... 474/160; 474/164

(58) Field of Classification Search .......... 474/122, 474/152, 155–158, 160, 164
See application file for complete search history.

(56) References Cited

U.S. PATENT DOCUMENTS

| | | | | |
|---|---|---|---|---|
| 4,889,521 A | | 12/1989 | Nagano | 474/164 |
| 5,192,248 A | * | 3/1993 | Nagano | 474/160 |
| 5,192,249 A | * | 3/1993 | Nagano | 474/160 |
| 5,273,495 A | * | 12/1993 | Nagano | 474/160 |
| 5,458,543 A | | 10/1995 | Kobayashi | 474/160 |
| 5,464,373 A | * | 11/1995 | Leng | 474/140 |
| 5,503,598 A | | 4/1996 | Neuer et al. | 474/78 |
| 5,514,042 A | * | 5/1996 | Liou | 474/160 |
| 5,545,096 A | * | 8/1996 | Su | 474/160 |
| 5,609,536 A | * | 3/1997 | Hsu | 474/160 |
| 5,738,603 A | * | 4/1998 | Schmidt et al. | 474/158 |
| 5,876,296 A | * | 3/1999 | Hsu et al. | 474/160 |
| 6,007,442 A | * | 12/1999 | Schmidt | 474/122 |
| 6,022,284 A | | 2/2000 | Bartolozzi et al. | 474/80 |
| 6,340,338 B1 | | 1/2002 | Kamada | 474/160 |
| 6,572,500 B2 | * | 6/2003 | Tetsuka | 474/160 |
| 6,805,645 B2 | * | 10/2004 | Mao et al. | 474/160 |
| 2005/0079940 A1 | | 4/2005 | Reiter | 474/160 |

OTHER PUBLICATIONS

Taiwanese Utility Model Publication No. TW M325288, Jan. 11, 2008, 12 pages.
Taiwanese Utility Model Publication No. TW 592197, Jun. 11, 2004, 5 pages.
European Patent Publication No. EP 0538780 A1, Apr. 28, 1993, 19 pages.

* cited by examiner

*Primary Examiner* — William A Rivera
(74) *Attorney, Agent, or Firm* — Alan Kamrath; Kamrath IP Lawfirm, PA

(57) ABSTRACT

A multiple sprocket assembly for a bicycle includes a larger diametrical sprocket and a smaller diametrical sprocket. The larger diametrical sprocket includes at least one auxiliary guiding portion for facilitating a bicycle chain to shift from the smaller diametrical sprocket to the larger diametrical sprocket.

17 Claims, 8 Drawing Sheets

MULTIPLE SPROCKET ASSEMBLY

BACKGROUND OF THE INVENTION

1. Field of the Invention

The present invention relates to a multiple sprocket assembly for a bicycle.

2. Description of the Related Art

U.S. Pat. No. 5,458,543 disclose a bicycle multiple sprocket assembly which has a link plate for bending and radially supporting a bicycle chain when the bicycle chain is shifted from a smaller diametrical sprocket to a larger diametrical sprocket. The link plate is connected thereto by a fastener. A problem with the link plate is that it makes the assembly heavier and could come loose from the larger diametrical sprocket after a series of shifts. As a result, the bicycle chain can no longer be shifted accurately. Another problem is that the bicycle chain can seriously wear the link plate.

SUMMARY OF THE INVENTION

A multiple sprocket assembly for a bicycle includes a larger diametrical sprocket and a smaller diametrical sprocket and the larger diametrical sprocket, includes at least one auxiliary guiding portion for facilitating a shift of a bicycle chain from the smaller diametrical sprocket to the larger diametrical sprocket.

Namely, the bicycle chain includes a plurality of inner and outer links, and the at least one auxiliary guiding portion includes a guiding recess having a bottom side inset and extending on a lateral side of the larger diametrical sprocket and a peripheral edge at which a substantially half profile of one of the plurality of outer links or otherwise one of the plurality of inner links is received. Upon the shift of the bicycle chain from the smaller diametrical sprocket to the larger diametrical sprocket, the peripheral edge receives the plurality of inner and outer links successively.

DETAILED DESCRIPTION OF THE PREFERRED EMBODIMENT

Figure 1:
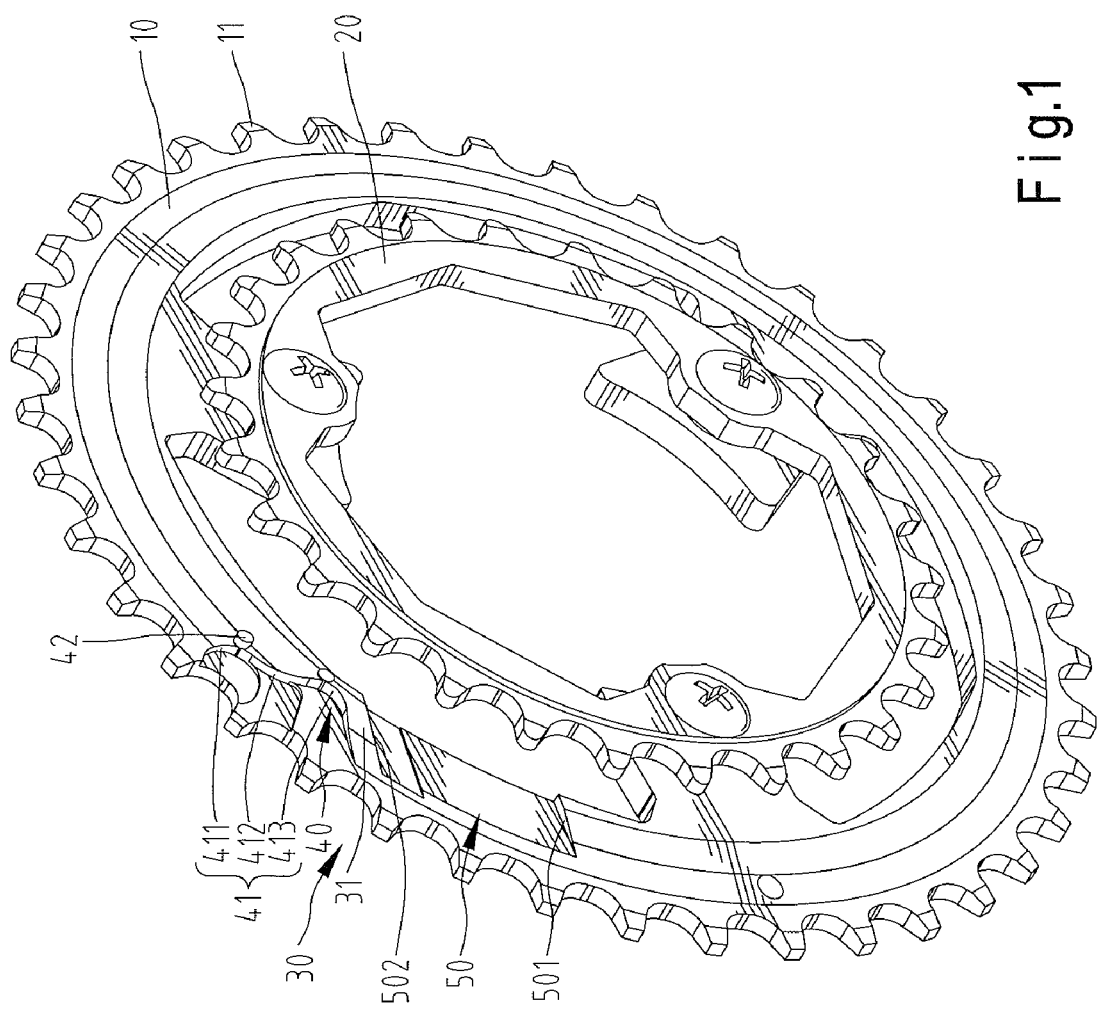
FIG. 1 is a perspective view of a multiple sprocket assembly in accordance with a first embodiment of the present invention, with the multiple sprocket assembly including smaller and larger diametrical sprockets.
Figure 2:
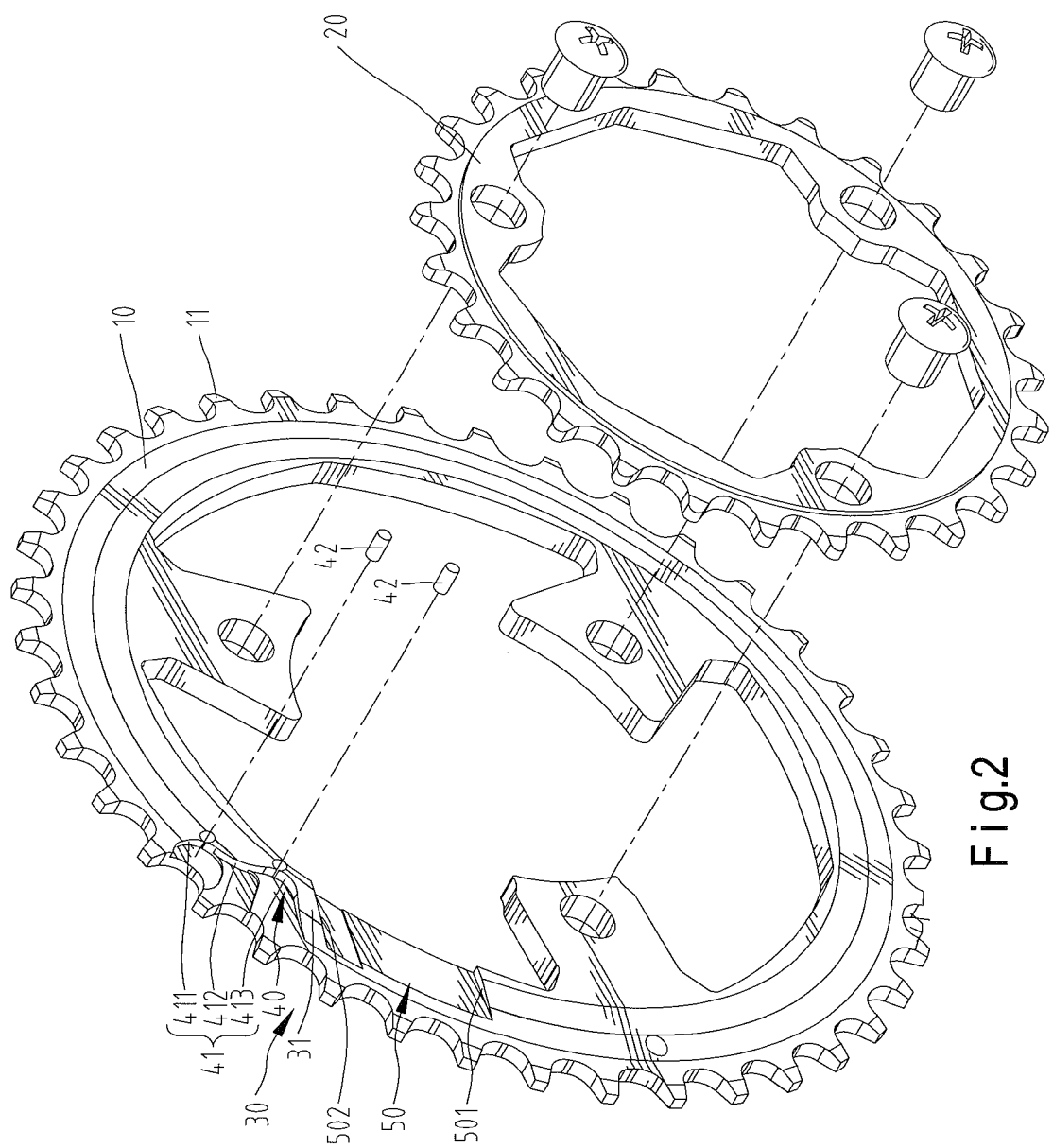
FIG. 2 is an exploded perspective view of FIG. 1.
Figure 3:
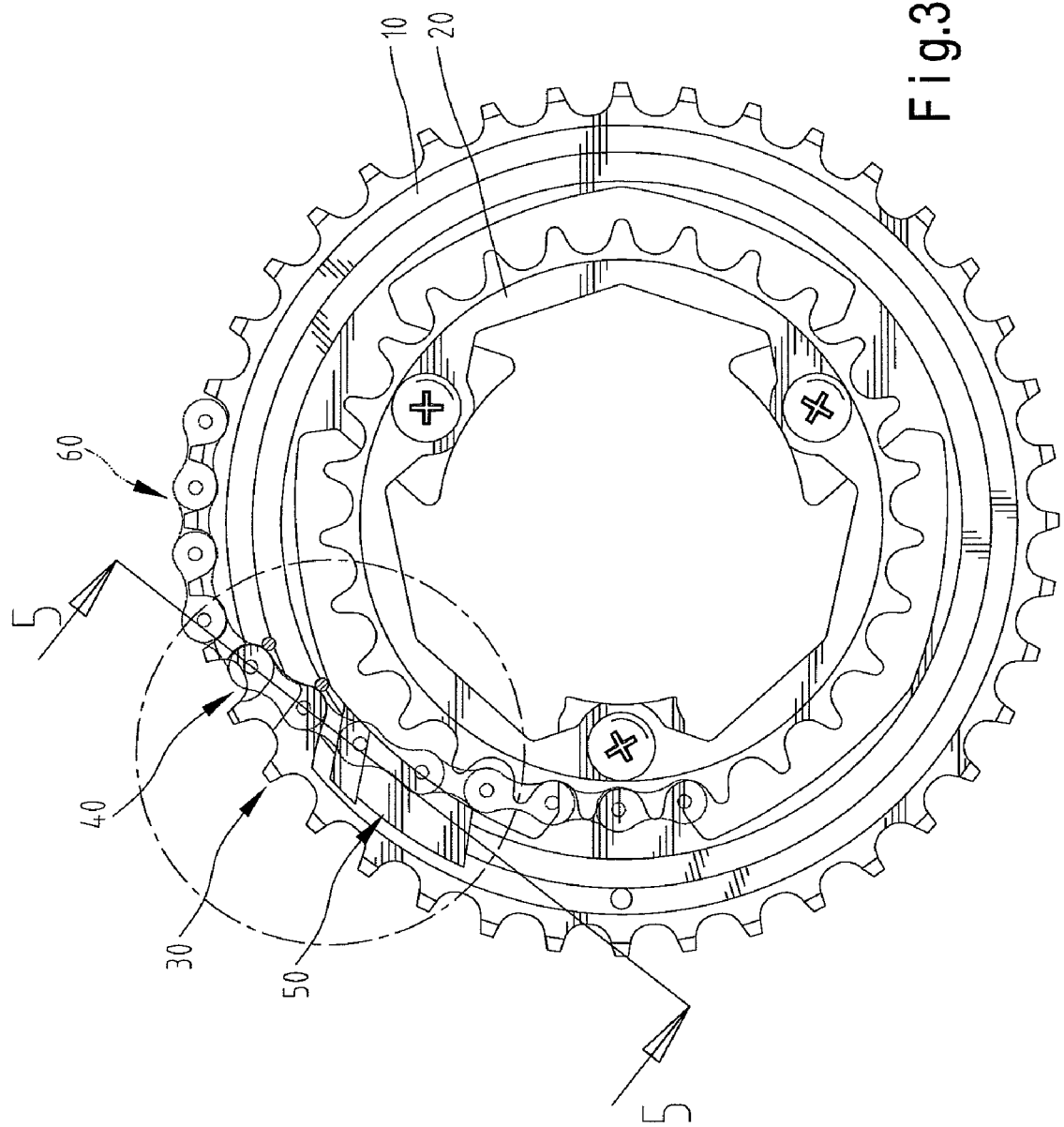
FIG. 3 is a side view illustrating a chain shifted from the smaller diametrical sprocket to the larger diametrical sprocket, with the chain shown in partial and in phantom.
Figure 4:
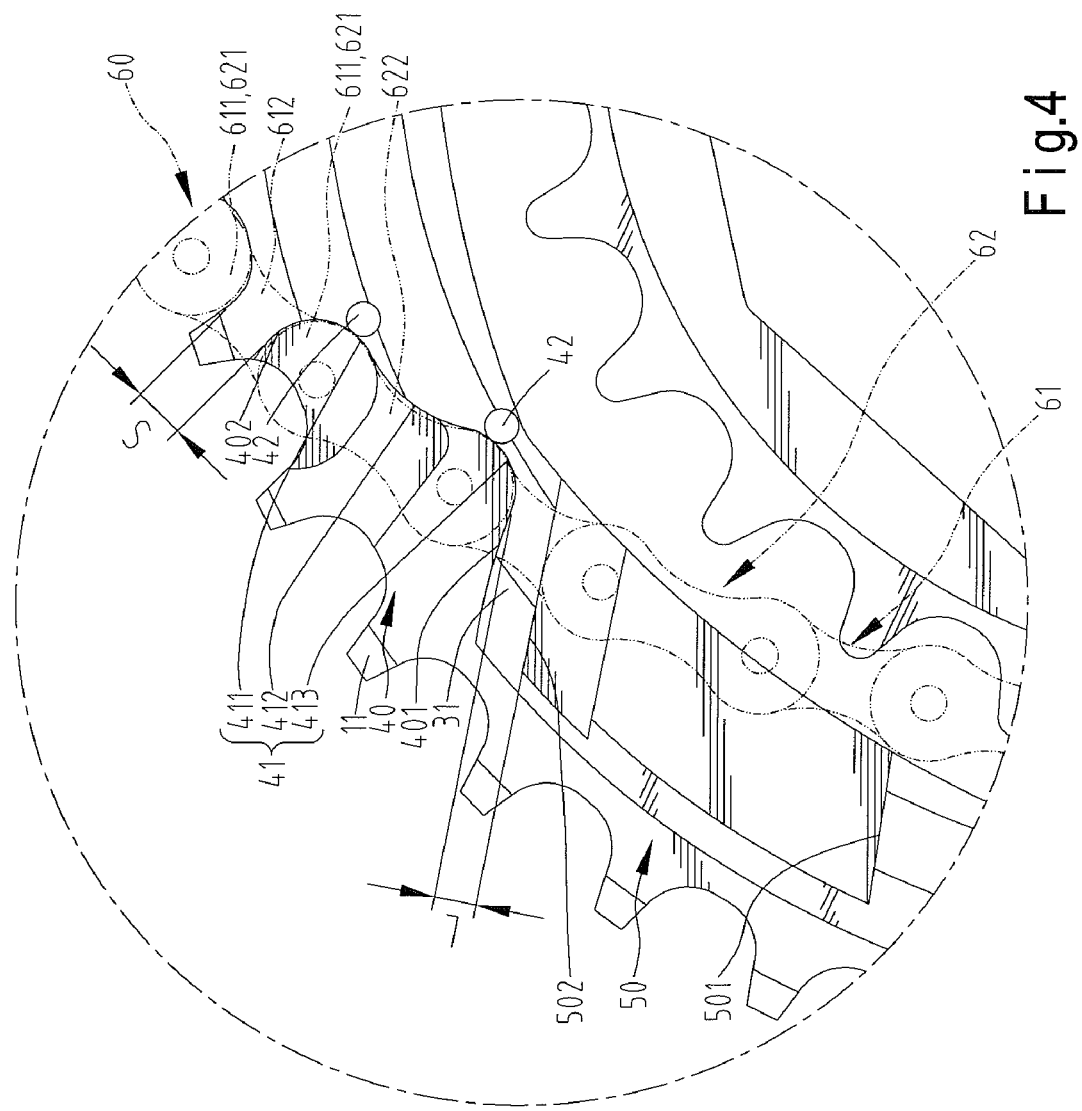
FIG. 4 is a partial, enlarged view of FIG. 3.
Figure 5:
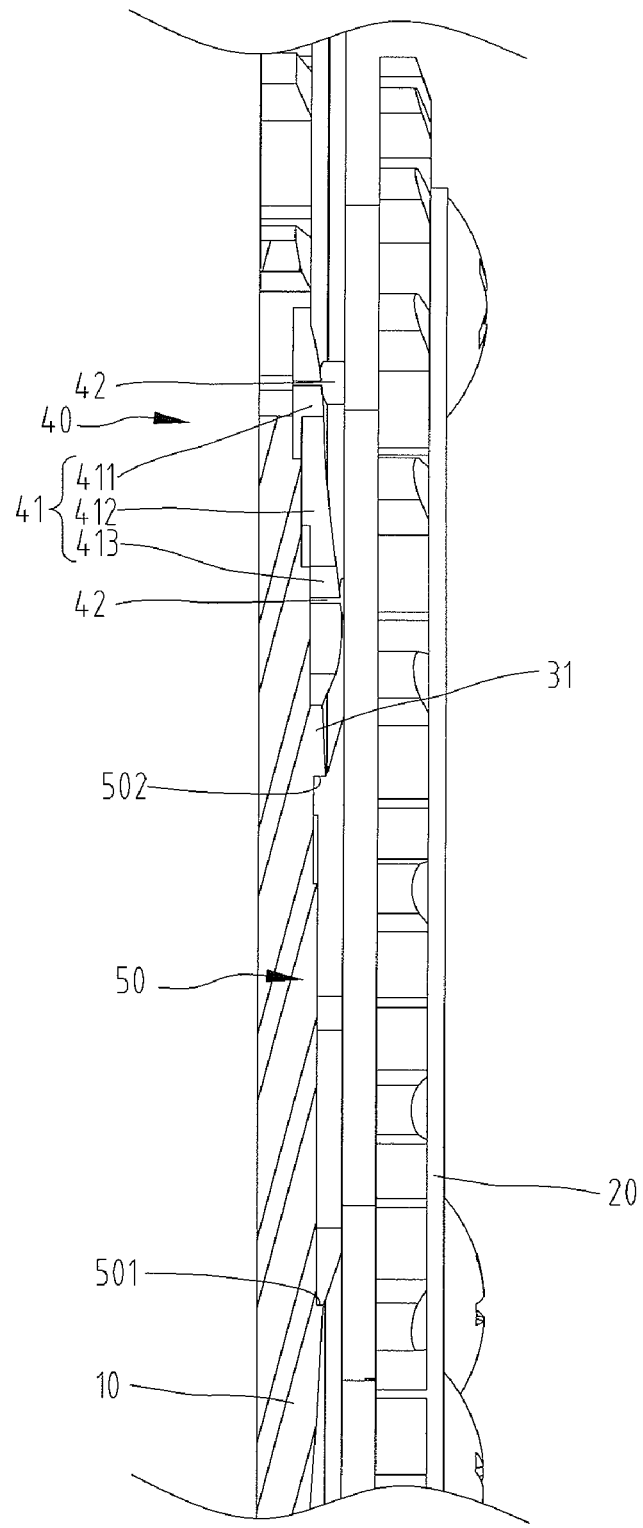
FIG. 5 is a cross-sectional view of line 5-5 in FIG. 3.
Figure 6:
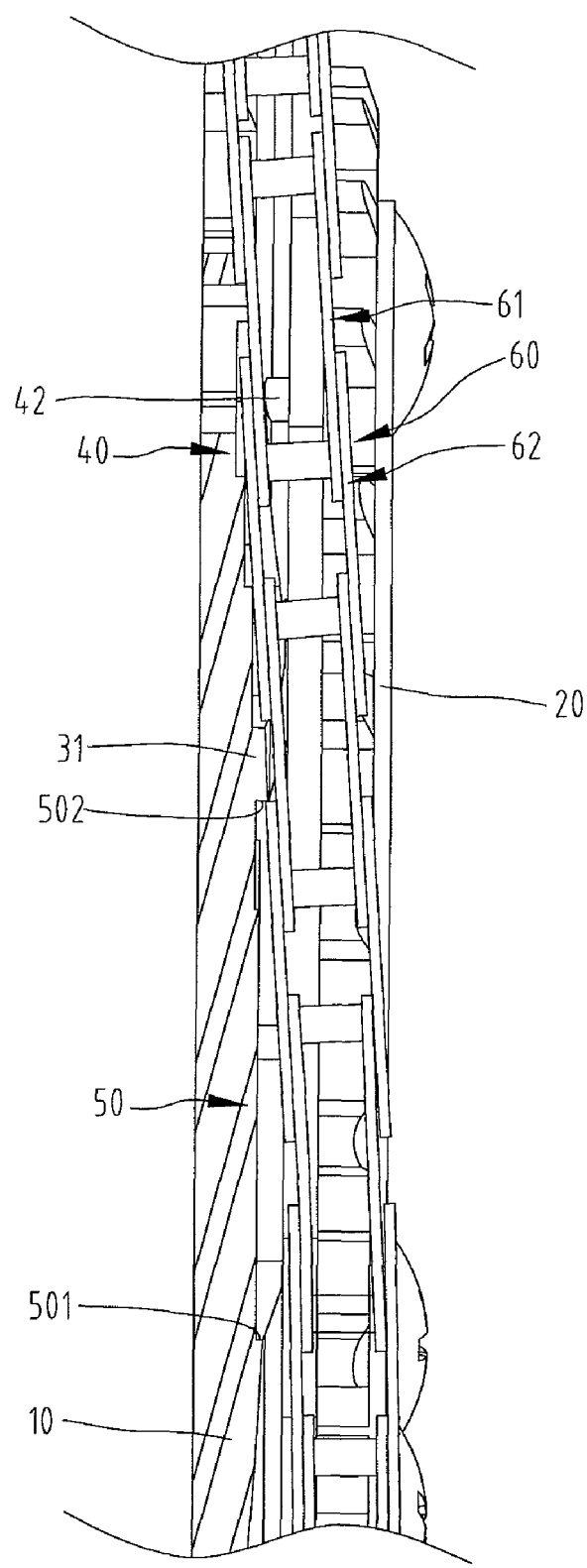
FIG. 6 is a cross-sectional view similar to FIG. 5, but showing the multiple sprocket assembly and the chain.

Referring to FIGS. 1 through 6, a multiple sprocket assembly for a bicycle in accordance with a first embodiment of the present invention includes a larger diametrical sprocket 10 and a smaller diametrical sprocket 20. The larger diametrical sprocket 10 includes a plurality of teeth 11 and at least one auxiliary guiding portion 30 for facilitating a shift of a bicycle chain 60 from the smaller diametrical sprocket 20 to the larger diametrical sprocket 10.

Typically, the bicycle chain 60 includes a plurality of inner links 61 each having two inner plates (not numbered), and each inner plate has two connection ends 611. Then, two connectors (not numbered) are utilized to join the two inner plates of one of the plurality of inner links 61 at the connection ends 611, and the two connectors are spaced by a gap 612. The bicycle chain 60 also includes a plurality of outer links 62 alternating the plurality of inner links 61. Each outer link 62 has two outer plates (not numbered), and each outer plate has two connection ends 621. Likewise, two connectors (not numbered) are utilized to join the two outer plates of one of the plurality of outer links 62 at the connection ends 621, and the two connectors are spaced by a gap 622. The plurality of teeth 11 are engageable in the gaps 612 and 622.

The at least one auxiliary guiding portion 30 includes a guiding recess which is inset on a lateral side of the larger diametrical sprocket 10 and includes a bottom side which extends on the lateral side. Further, the bottom side has an extent up to an outer edge of the larger sprocket 10. Preferably, the bottom side has a stepped configuration and includes a proximal end 401 having a first elevation with respect to the plurality of teeth 11 and a distal end 402 having a second elevation with respect to the plurality of teeth 11 lower than the first elevation. The guiding recess 40 further includes a peripheral edge 41 which is substantially transverse to the bottom side and defines first, second and third sections 411, 412, and 413 in which one of the plurality of outer links 62 or otherwise one of the plurality of inner links 61 is received. So, upon the shift of the bicycle chain 60 from the smaller diametrical sprocket 20 to the larger diametrical sprocket 10, one of the plurality of inner links 61 and one of the plurality of outer links 62 is received by the peripheral edge 41 successively. Specifically, if the inner link 61 is received by the peripheral edge 41, the inner link 61 has the two inner plates each with a substantially half profile received by the peripheral edge 41, and if the outer link 62 is received by the peripheral edge 41, the outer link 62 has the two outer plates each with a substantially half profile received by the peripheral edge 41. More specifically, each of the connection end 611, 621 of the respective inner and outer links 61, 62 has a lowest point contactable with the first and third sections 411, 413, while the second section 412 is marginally spaced from any one of the received inner and outer links 61, 62. Additionally, the peripheral edge 41 has a contour which substantially equals the half profiles of the two inner plates of the received inner link 61 or the half profiles of the two outer plates of the received outer link 62. As such, the shift of the bicycle chain 60 is facilitated, and the problems encountered in the admitted prior art herein is overcome.

The multiple sprocket assembly further includes two supporting pins 42 which are embedded on the lateral side of the larger diametrical sprocket 10 and are contemplated not to exceed its height. The supporting pins 42 are disposed in juxtapose to the peripheral edge 41 to support the connection ends 611, 621 of one of the plurality of inner and outer links 61, 62 received by the peripheral edge 41. Preferably, each connection end 611, 621 has the lowest point contactable by one supporting pin 42. Moreover, each supporting pin 42 is made of material which has a hardness greater than that of either the larger and smaller sprockets 10, 20. As such, the supporting pins 42 prevent the connections ends 611, 621 wearing the peripheral edge 41 such that the peripheral edge 41 are extended in life. It is appreciated that each supporting pin 42 may even has a hardness greater than that of the bicycle chain 60, such that the user does not worry that the bicycle chain 60 will wear the peripheral edge 41.

The multiple sprocket assembly further includes a diverting recess 50 for avoiding the bicycle chain 60 from wearing the lateral side of the larger sprocket 10 upon the shift of the bicycle chain 60 from the smaller diametrical sprocket 20 to the larger diametrical sprocket 10. The diverting recess 50 is inset on the lateral side and includes a bottom side which extends on the lateral side. Preferably, the bottom side has a sloped configuration and includes a proximal end 501 having a first elevation with respect to the plurality of teeth 11 and a distal end 502 having a second elevation with respect to the plurality of teeth 11 lower than the first elevation.

Additionally, the larger diametrical sprocket 10 includes a portion of the lateral side defined as a shifting plate 31 interconnecting the diverting recess 50 and the guiding recess 40. It is contemplated that the shifting plate 31 has a predetermined width L larger than a width S of one of the gaps 611 or one of the gaps 621. Thus, it is ensured that only one inner link or otherwise one outer link 61, 62 is received by the peripheral edge 41.

Figure 7:
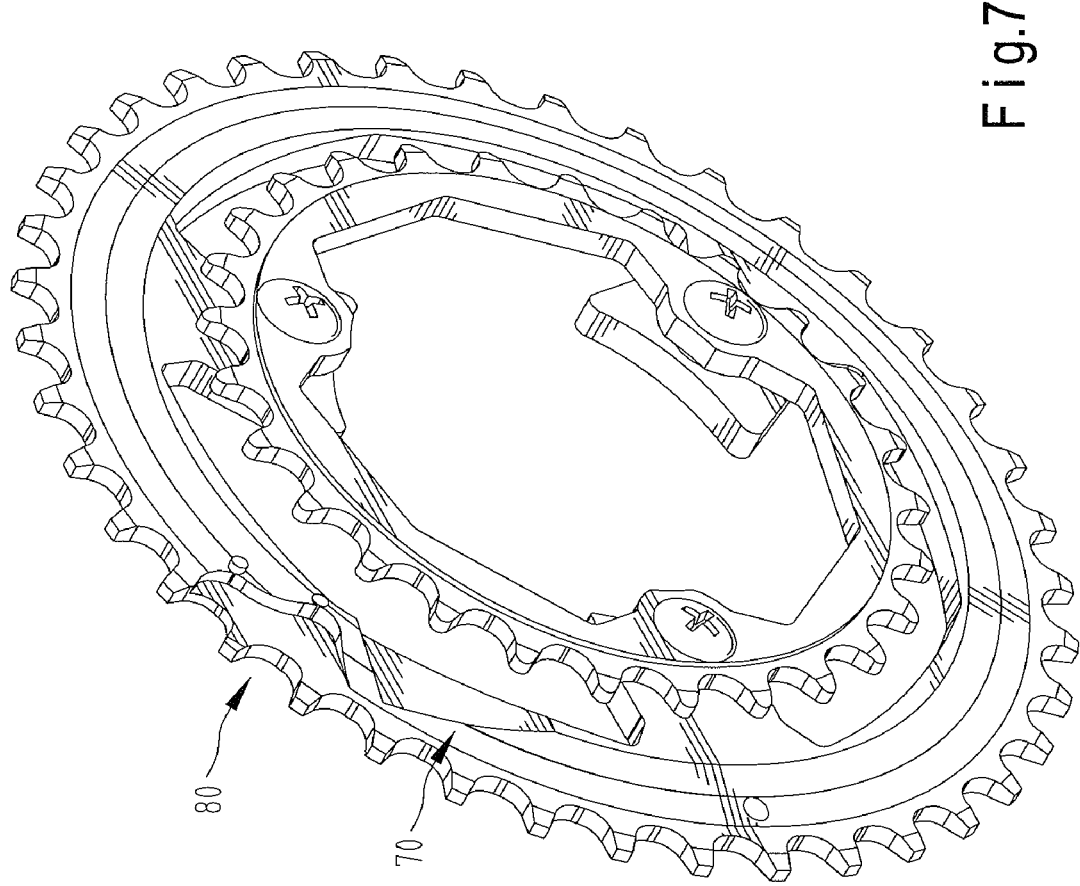
FIG. 7 is a perspective view of a multiple sprocket assembly in accordance with a second embodiment of the present invention, with the multiple sprocket assembly including smaller and a larger diametrical sprockets.
Figure 8:
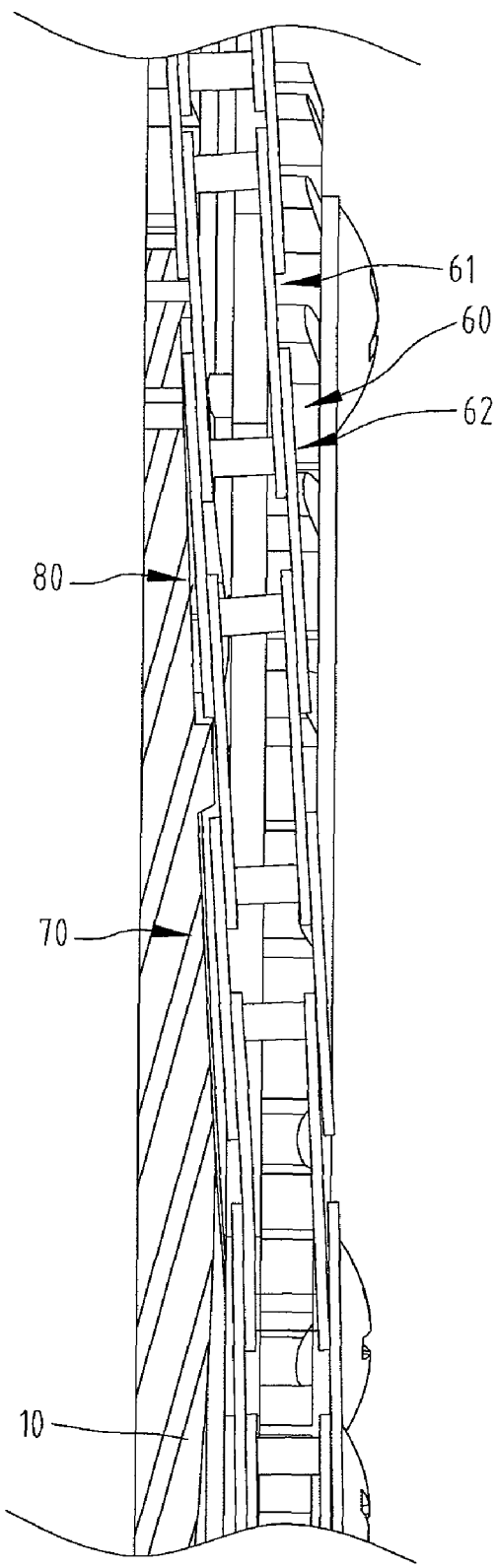
FIG. 8 is a cross-sectional view illustrating a chain shifted from the smaller diametrical sprocket to the larger diametrical sprocket.

Referring to FIGS. 7 and 8, a multiple sprocket assembly in accordance with a second embodiment of the present invention is differentiates from the first embodiment in that a guiding recess 80 is utilized to replace the guiding recess 40 and in that a diverting recess 70 is utilized to replace the diverting recess 50. The guiding recess 80 has a sloped configuration. Further, the diverting recess 70 has a sloped configuration.

While the specific embodiments have been illustrated and described, numerous modifications come to mind without significantly departing from the spirit of invention, and the scope of invention is only limited by the scope of accompanying claims.

What is claimed is:

1. A multiple sprocket assembly for a bicycle includes a larger diametrical sprocket and a smaller diametrical sprocket, with the larger diametrical sprocket including at least one auxiliary guiding portion for facilitating a shift of a bicycle chain from the smaller diametrical sprocket to the larger diametrical sprocket, with the bicycle chain including a plurality of inner links and a plurality of outer links alternating the plurality of inner links, with each inner link having two inner plates and each inner plate having a profile and two connection ends, with the two inner plates joined by two connectors at the connection ends, with each outer link having two outer plates, with each outer plate having a profile and two connection ends, with the two outer plates joined by two connectors at the connection ends of the two outer plates, and the at least one auxiliary guiding portion comprising:

a guiding recess inset on a lateral side of the larger diametrical sprocket and including a bottom side extending on the lateral side, with the bottom side having an extent up to an outer edge of the larger diametrical sprocket, with the outer edge including a plurality of teeth formed thereon, with the guiding recess further including a peripheral edge substantially transverse to the bottom side and defining first, second and third sections in which one of the plurality of outer links and one of the plurality of inner links is received successively, and with the one outer link having the two outer plates each with a substantially half profile or otherwise the one inner link having the two inner plates each with a substantially half profile received by the peripheral edge; and a diverting recess inset on the lateral side of the larger diametrical sprocket for avoiding the bicycle chain wearing the lateral side upon the shift of the bicycle chain from the smaller diametrical sprocket to the larger diametrical sprocket, with one of the plurality of outer links or one of the plurality of inner links received in the periphery edge of the guiding recess, wherein the larger diametrical sprocket includes a portion of the lateral side defined as a shifting plate interconnecting the diverting recess and the guiding recess.

2. The multiple sprocket assembly as claimed in claim 1 wherein the at least one auxiliary guiding portion further comprises two supporting pins embedded on the lateral side of the larger diametrical sprocket, wherein the two supporting pins are disposed in juxtapose to the peripheral edge, and wherein each of the connection ends of the one of the plurality of inner and outer links received by the peripheral edge includes a lowest point contactable with one of the two supporting pins.

3. The multiple sprocket assembly as claimed in claim 2 wherein the peripheral edge has a contour substantially equaling the substantially the half profiles of the two inner plates of the one of the plurality of inner links or the half profiles of the two outer plates of the one of the plurality of outer links.

4. The multiple sprocket assembly as claimed in claim 2 wherein each of the two supporting pins has a hardness greater than either the larger and smaller sprockets.

5. The multiple sprocket assembly as claimed in claim 2 wherein each of the two supporting pins has a hardness greater than the bicycle chain.

6. The multiple sprocket assembly as claimed in claim 2 wherein the first section is coextensive with the diverting recess, wherein the third section has an extent further from the outer edge than an extent of the first section, with one of the two supporting pins being adjacent the first section and the diverting recess and another of the two supporting pins being adjacent the third section and at a greater spacing from the outer edge than the one of the two supporting pins.

7. The multiple sprocket assembly as claimed in claim 3 wherein the bottom side of the guiding recess is stepped.

8. The multiple sprocket assembly as claimed in claim 3 wherein the bottom side of the guiding recess is sloped.

9. The multiple sprocket assembly as claimed in claim 3 wherein the diverting recess is stepped.

10. The multiple sprocket assembly as claimed in claim 3 wherein the diverting recess is slopped.

11. The multiple sprocket assembly as claimed in claim 1 wherein the peripheral edge has a contour substantially equaling the substantially half profiles of the two inner plates of the one of the plurality of inner links or the half profiles of the two outer plates of the one of the plurality of outer links.

12. The multiple sprocket assembly as claimed in claim 11 wherein the bottom side of the guiding recess is stepped.

13. The multiple sprocket assembly as claimed in claim 11 wherein the bottom side of the guiding recess is sloped.

14. The multiple sprocket assembly as claimed in claim 11 wherein the diverting recess is stepped.

15. The multiple sprocket assembly as claimed in claim 11 wherein the diverting recess is slopped.

16. The multiple sprocket assembly as claimed in claim 1 wherein the diverting recess is stepped.

17. The multiple sprocket assembly as claimed in claim 1 wherein the diverting recess is slopped.

* * * * *